United States Patent [19]

Lang

[11] Patent Number: 4,668,442
[45] Date of Patent: May 26, 1987

[54] COLUMN PACKING

[76] Inventor: Ko C. Lang, 3072 E. Sierra Dr., Westlake Village, Calif. 91362

[21] Appl. No.: 775,584

[22] Filed: Sep. 12, 1985

[51] Int. Cl.⁴ .............................................. B01F 3/04
[52] U.S. Cl. .............................. 261/94; 261/DIG. 72
[58] Field of Search .......................... 261/DIG. 72, 94

[56] References Cited

U.S. PATENT DOCUMENTS

| | | | |
|---|---|---|---|
| D. 232,236 | 7/1974 | La Borde | 261/DIG. 72 |
| D. 243,531 | 3/1977 | Stringle, Jr. | D23/4 |
| 2,212,932 | 8/1940 | Fairlie | 261/DIG. 72 |
| 2,546,479 | 3/1951 | Sodano | 261/DIG. 72 |
| 3,266,787 | 8/1966 | Eckert | 261/DIG. 72 |
| 3,506,248 | 4/1970 | Starbuck et al. | 261/DIG. 72 |
| 3,618,910 | 11/1971 | Arndt | 261/94 |
| 3,752,453 | 8/1973 | Doyne | 261/94 |
| 3,914,351 | 10/1975 | McKeown et al. | 261/98 |
| 4,072,736 | 2/1978 | Fattinger | 261/97 |
| 4,086,307 | 4/1978 | Glaspie | 261/97 |
| 4,122,011 | 10/1978 | Strigle, Jr. | 261/DIG. 72 |
| 4,203,935 | 5/1980 | Hackenjos | 261/98 |
| 4,425,285 | 1/1984 | Shimoi et al. | 261/DIG. 72 |
| 4,519,960 | 5/1985 | Kitterman et al. | 261/DIG. 72 |
| 4,537,731 | 8/1985 | Billet et al. | 261/DIG. 72 |

FOREIGN PATENT DOCUMENTS

| | | | |
|---|---|---|---|
| 2914079 | 10/1980 | Fed. Rep. of Germany | 261/DIG. 72 |
| 2403818 | 5/1979 | France | 53/20 |
| 2021970 | 2/1983 | United Kingdom | 53/20 |

Primary Examiner—Tim Miles
Attorney, Agent, or Firm—Poms, Smith, Lande & Rose

[57] ABSTRACT

An improved packing body for use in packed columns which is formed of a longitudinally extending central core from which a plurality of web members generally radially extend. The web members are in substantially axial alignment with the core and are formed of a plurality of open cellular units. The packing body provides a maximal amount of wettable surface area and drip formation points with a minimum of obstruction to fluid flow within a packed column.

13 Claims, 6 Drawing Figures

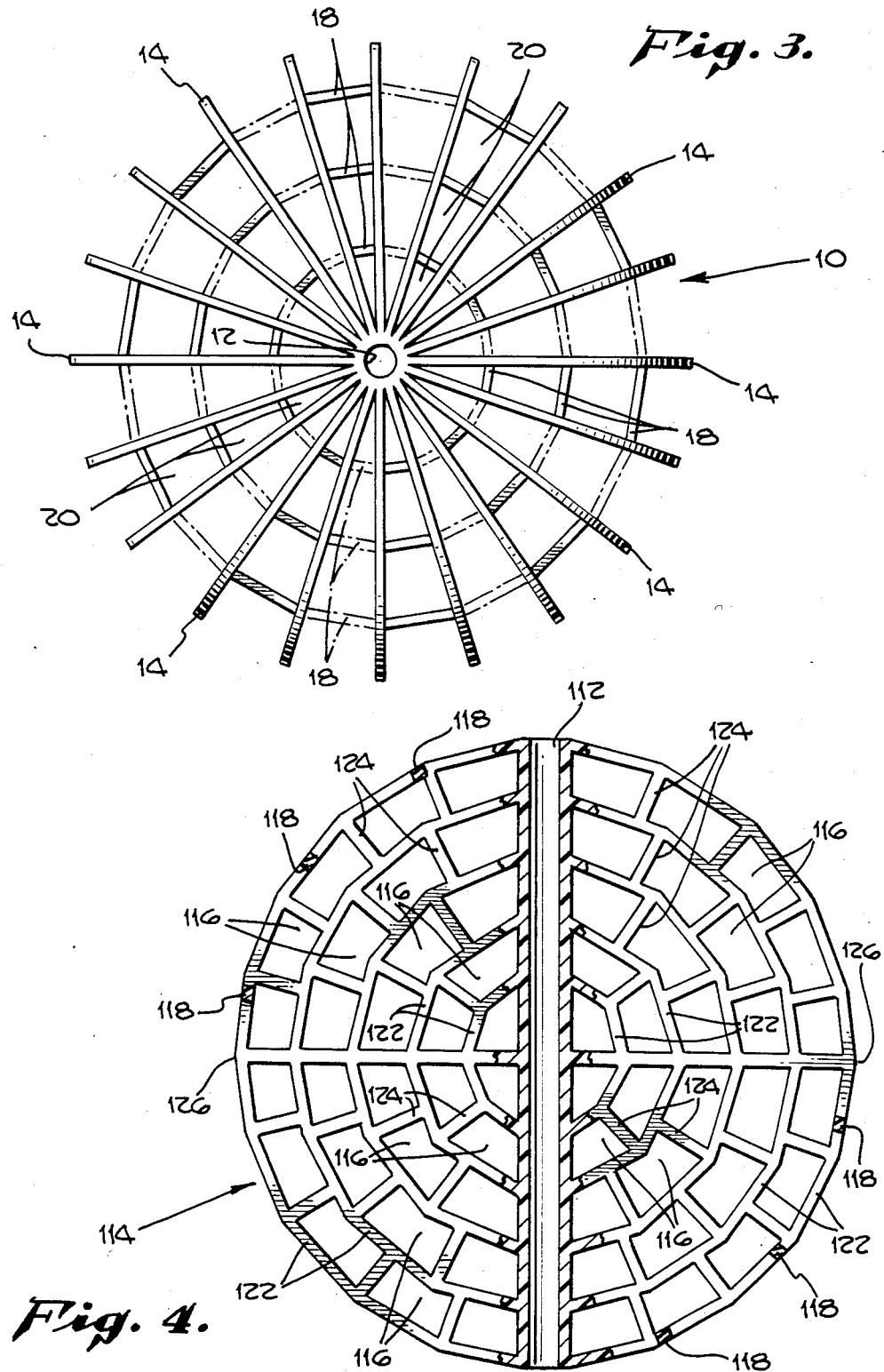

COLUMN PACKING

BACKGROUND OF THE INVENTION

The present invention is directed in a broad aspect to column or tower packings for use in packed column chemical processing operations such as absorption, desorption, distillation, extraction, scrubbing, drying, cooling, water treatment and the like. More particularly, the present invention is directed to a new and improved high efficiency, high performance packing body for use in such chemical apparatus.

Column or tower packing bodies have been long used to enhance the efficiency and productivity of a variety of chemical processes involving fluid interaction. Generally speaking, packing bodies are a contact media which is necessary for certain types of chemical processing operations such as the aforementioned distillation and scrubbing procedures. In such processing operations, a stream of liquid is brought together with a stream of gas or another liquid in a confined environment such as a column, tower, or other vessel so as to accomplish an exchange of materials or heat or both between the two streams of fluid. On a microscopic scale this transfer of mass or heat is driven by the laws of physical chemistry. On a larger or industrial scale this transfer is significantly influenced by the gross physical properties of the liquid or gas streams and their mixing environment—large areas of fluid contact and interaction increasing the transfer rate and efficiency of a given process and restrictive fluid flow decreasing its overall performance.

In order to increase the efficiency and practicality of these chemical processing operations, a variety of column packing materials have been used in the past to enhance the essential contact between the two streams of material involved. These prior art packing materials range from the early used gravel and broken glass to man made bodies having unique geometric shapes such as perforated cylinders, saddles, helical rings and spiked or latticework balls. Depending on the desired application, these latter synthetic packing bodies are made of either plastic, metal or ceramic, and range in size from a few centimeters to tens of centimeters across.

The performance of packed columns or towers is significantly affected by the column packing material used. Because packed columns are often the most critical step in a chemical processing procedure, the performance of the packed column can significantly affect both product yield and production rate as well as the overall economic viability of the process. The most important parameters for judging the performance of a column packing are its mass or heat transfer rate and its pressure drop. The latter parameter dictating the energy requirements necessary to maintain the packed column operation. The best performing column packing provides the maximum mass or heat transfer rate with a minimum or acceptable pressure loss.

A number of factors affect the performance of column packing materials per se. These factors are interrelated and are products of the physical geometry of the individual packing bodies making up the total packing material loaded into a column or tower. These factors are: interlocking, channeling, chimneying, fouling, nonuniform flow, wetting, and flooding.

Briefly stated, interlocking occurs when the individual bodies of the column packing materials mesh together within the packed column. This occurs when the packing bodies lack geometric uniformity and contain projections or open areas. Interlocking creates uneven fluid flow patterns, dead spaces where solid deposits may build up, and reduces available surface area thereby reducing column efficiency.

Channeling refers to an excessive amount of liquid flowing along the outer surfaces of a packing material. It occurs when the packing bodies are nonuniformly situtated within a column or tower. Similarly, chimneying refers to an excessive amount of gas passing through open areas in unevenly situated packing materials. In both cases, the fluid flow patterns are distorted and result in reduced transfer rates and high pressure drops and a reduction in column efficiency.

Fouling occurs when deposits of particulate matter accumulate on the surfaces of the packing material or in the dead spaces between packing materials. Reduced fluid flow accentuates this problem. By reducing available surface area and plugging a portion of a packed column fouling will also reduce transfer rates and increase pressure drop within a column. All of these factors result in an overall nonuniform liquid or gas flow which reduces column performance.

Wetting the column packing surface to provide gas/liquid or liquid/liquid contact is essential to the operation of a packing material. Packings which interlock will leave large fractions of their surface area unexposed to wetting. For a given packing material there is a minimum liquid flow required to produce approximate total wetting of the available surface area. This minimum liquid flow is called the "wetting point".

Conversely, packing materials inherently restrict a certain amount of liquid flow. This restriction varies with the liquid and gas flow rates. It reaches its maximum or "flooding point" when the gas velocity exceeds a certain limit for a given liquid flow rate. This gas velocity is called the "flooding velocity" and is utilized in the design of column size and gas velocity for a given chemical process.

An ideal column packing would offer the lowest wetting point and the highest flooding point under given column operating parameters. This ideal packing would operate with a minimum of liquid flow and a maximum gas velocity which enables a chemical process to be carried out using a smaller packed column. As a result, initial capital outlay and subsequent operating expenses would be reduced.

It has been commonly accepted in the art for over 60 years that a high transfer rate can only be achieved with a column packing which provides a large surface and a correspondingly large pressure drop due to restricting gas flow within the column. Thus, the ideal prior art column packing materials are a tradeoff between efficiency and overall performance. Accordingly, it is a principal object of the present invention to provide a column packing body which provides a high transfer rate with a low pressure drop.

It is a further object of the present invention to provide a column packing body which resists interlocking and deformation and the attendant problems of channeling, chimneying, fouling and nonuniform fluid flow.

It is a further object of the present invention to provide a column packing body with a surface area that will achieve approximate total wetting of the packing surface at a low wetting point and which will also provide a high flooding point under column operating conditions.

SUMMARY OF THE INVENTION

The present invention achieves these and other objects by providing a packing material comprised of packing bodies having unique internal and external geometry which produces a maximal amount of wettable surface area with a minimal amount of obstruction to gas or liquid flow. Additionally, the packing body of the present invention effectively resists interlocking and deformation and thereby exposes its total surface area to gas and liquid flow. Moreover, the packing body of the present invention accomplishes these objectives regardless of its orientation with respect to fluid flow. Because of its unique geometric configuration, the packing body of the present invention can be randomly "dumped" into a column or tower without fear of uneven packing and the resultant channeling, chimneying, and nonuniform fluid flow.

The unique high efficiency, high performance packing body of the present invention accomplishes these objectives by providing a generally symmetrical packing body composed of a plurality of generally uniformly distributed open cellular units. Unlike the asymetrical packing bodies of the prior art, this uniform symetrical structure exhibits a complete lack of orientation preference with respect to the direction of fluid flow in a packed column or tower.

More specifically, a preferred embodiment of the packing body of the present invention is formed from a generally longitudinally extending central core having a plurality of web members generally radially extending therefrom in substantially axial alignment with the core. Each radiating web member is substantially identical in construction and formed of a plurality of open cellular units which are generally uniformly distributed along the radial extent of each web member. As a result, the packing body of the present invention has a generally symmetrical surface or configuration formed of the outer edges of the radially extending web members. As an additional result, the internal volume of the packing body of the present invention is formed of a plurality of open cellular units which are generally uniformly distributed throughout.

The web members themselves are substantially identical and are preferably formed of a plurality of generally concentric arcuate members which are uniformly spaced apart from one another along the radial extent of the web. It is preferred that each arcuate member be attached to the longitudinally extending core to provide structural integrity and strength to the packing body. However, it is not necessary for the central core to completely extend to the outer edges of the web members. Additionally, adjacent pairs of the arcuate members are interconnected by radially extending struts. This construction defines the open cellular units of each web member and also provides additional structural integrity. These interconnecting radially extending struts can be aligned along individual radii of the packing body or staggered with respect to one another.

Alternative embodiments of the present invention can be formed of generally symmetrical web members of a variety of configurations. For example, substantially planar web members provided with a plurality of holes of various shapes such as circles or polygons can be utilized to form the packing body of the present invention. Similarly, web members formed of loosely woven fibers or interconnecting struts may also be utilized. However, it will be appreciated that the plurality of generally concentric arcuate members is preferred as this configuration provides a packing body which is the least sensitive to fluid flow orientation.

Additional structural integrity and surface area can be provided to the packing body of the present invention through means for interconnecting adjacent pairs of the web members. In the disclosed embodiment of the present invention these means for interconnecting comprise a plurality of rib members which are spaced remotely from the central core of the packing body and interconnect adjacent webs. In this manner, additional cellular units are defined as the overall structure of the packing body is further strengthened against deformation. These interconnecting ribs also discourage interlocking of adjacent spherical body members when packed into a column or tower by spanning the open areas between adjacent web members.

The arcuate members of the radially extending ribs can be smoothly curving or faceted. The faceted arcuate members are preferably formed from a continuation of short, straight stubs. It will be appreciated that smoothly curving arcuate members will form a packing body having a generally spherical outer configuration. Similarly, faceted arcuate members will form a packing body having a generally polygonal outer configuration. Either configuration is preferred as it will provide a packing body having a generally symmetrical configuration. Additionally, the central core can be solid or hollow and formed in a variety of diameters and lengths. The packing bodies themselves are preferably formed in diameters ranging from on the order of 25 millimeters to 300 millimeters or more.

Additionally, each radially extending web member may be bisected along its equatorial plane and the resulting longitudinally aligned opposing pairs of subportions of each web member may be laterally offset with respect to one another. Along these lines, the web members themselves can be formed in other than generally planer shapes. For example, concave or convex web members spiraling around the central core may be provided.

A further understanding of the present invention will be provided to those skilled in the art from the following detailed description and the associated drawings which will first be described briefly.

BRIEF DESCRIPTION OF THE DRAWINGS

FIG. 3 is a top elevational view of the preferred embodiment of the present invention of FIG. 1 taken along the plane III—III illustrating the radially extending web members and interconnecting ribs;

FIG. 4 illustrates an alternative embodiment;

DETAILED DESCRIPTION

Figure 1:
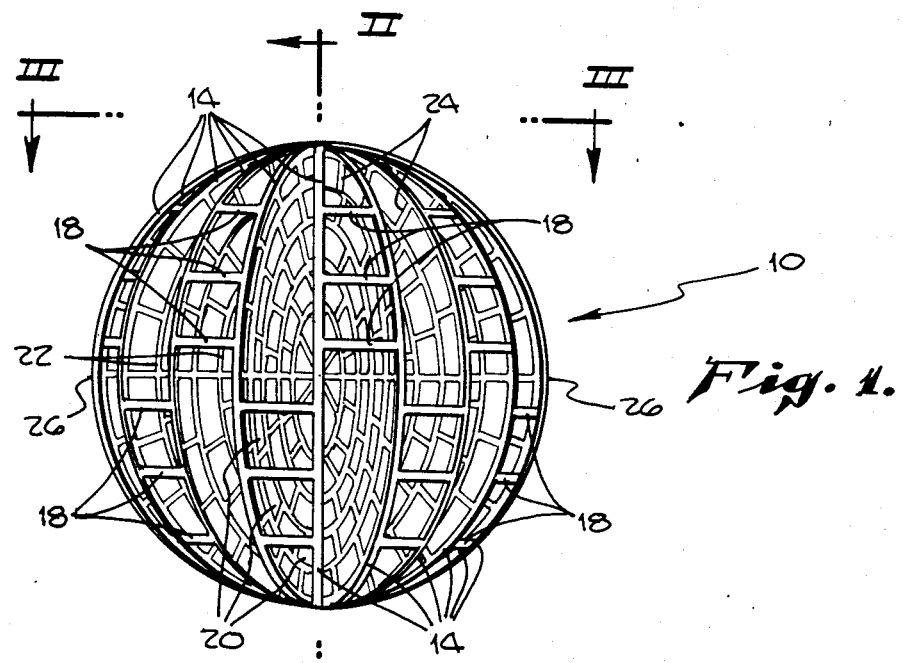
FIG. 1 is a side elevational view of a preferred embodiment of the present invention.

Referring more particularly to the drawings of FIGS. 1-4 in which representative examples of substantially identical structures are identified by identical reference numerals, the present invention discloses a preferred embodiment of an improved, high efficiency, high performance packing body generally indicated by reference 10. Packing body 10 is formed of a longitudinally extending central core 12 and a plurality of substantially identical generally semi-circular web members, each designated 14, which radially extend from core 12 and are substantially in axial alignment therewith. This symmetrical geometric configuration defines a packing body 10 having a generally spherical configuration which is devoid of surface irregularities, large open spaces and projections which may be prone to interlocking.

Figure 2:
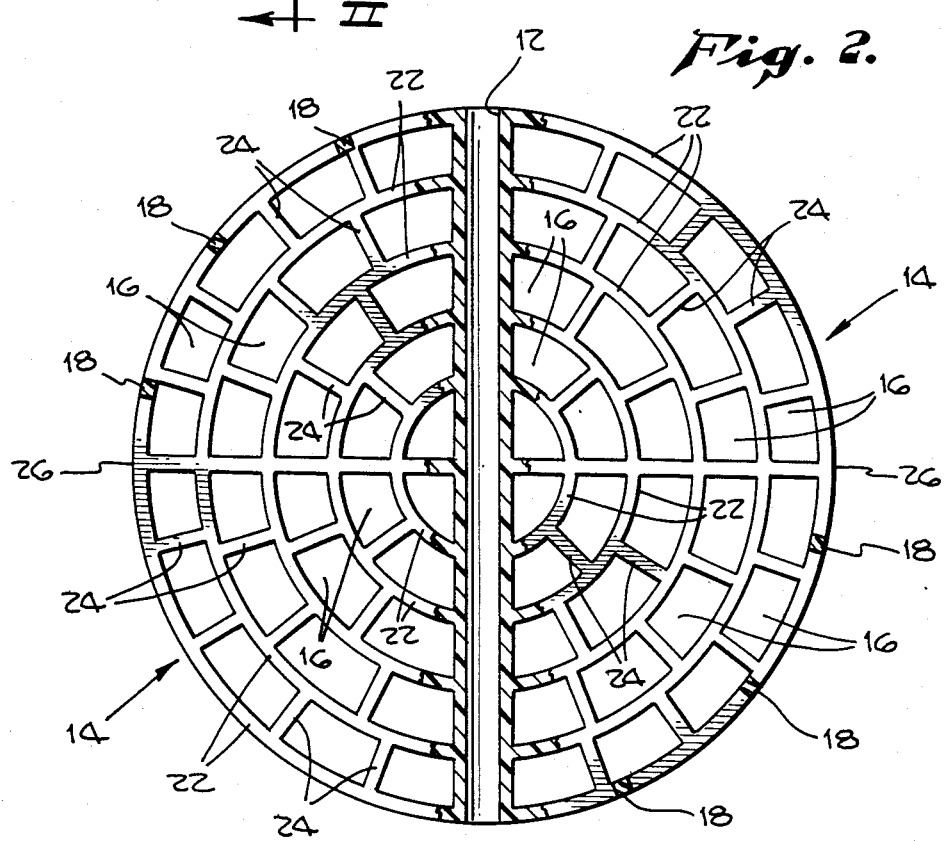
FIG. 2 is a partial cross section of the embodiment of the present invention of the FIG. 1 taken along the plane II—II illustrating the construction of a web member.

As shown in FIG. 2, each of the web members 14 is provided with a plurality of open cellular units 16 which are generally uniformly distributed along the radial extent of each of webs 14. Though cellular units 16 shown in FIG. 2 are substantially uniform in size, it is contemplated as being within the scope of the present invention for cellular units 16 to be of varying sizes within each of webs 14. However, it will be appreciated by those skilled in the art that uniformly sized open cellular units 16 are preferred as this provides a desired degree of uniformity throughout the spherical volume of packing body 10. Additionally, it should be emphasized that the number of open cellular units 16 in each web 14 may be varied from that disclosed in FIGS. 1-4.

Packing body 10 may also be formed with means for interconnecting at least some of web members 14 in order to enhance the structural integrity of the packing body. In the preferred embodiment of the present invention this means for interconnecting web members is contemplated as being a plurality of rib members 18 which are spaced remotely from central core 12 and in communicative engagement between adjacent web members 14 through nonadjacent web members may also be interconnected. It is contemplated that rib members 18 are integrally formed in connection with adjacent pairs of web members 14 and can be located anywhere from core 12 to the outer extent of each web 14. Rib members 18 are shown in FIG. 1 as projecting between adjacent web members 14 in substantially perpendicular orientation thereto and are shown in FIG. II in cross section. This arrangement of rib members 18 is preferred for ease of construction of body member 10. However, additional orientations or configurations of rib members 18 may also be employed to practice the present invention. For example, V-shaped or angular rib members may also be employed. Those skilled in the art will appreciate that interconnecting rib members 18 define additional open cellular units 20 between adjacent web members 14 as well as providing an enhanced degree of structural integrity to packing body 10. Moreover, rib members 18 also function to prevent the interlocking of adjacent packing bodies when the packing bodies are loaded into packed columns or towers. Any number of rib members 18 may be provided at a variety of locations throughout packing body 10.

Turning now to FIG. 2, a partial cross-sectional view of packing body 10 taken along a plane II—II illustrates the preferred construction of each web member 14. Each web member 14 is preferably formed of a plurality of generally concentrate arcuate members 22 which are preferably uniformly spaced apart from one another along the radial extent of each web member 14. Each arcuate member 22 is contemplated as being integrally formed with core 12 in order to facilitate the construction of packing body 10 and to provide additional strength and structural rigidity. However, it will be appreciated that core 12 need not extend completely between the outer surfaces of packing body 12. Moreover, it is also contemplated as being within the scope of the present invention for each arcuate member 22 to be broken or cut at various points along its arcuate extent. As will be discussed in more detail below, such cutting or breaking will provide additional dripping points and enhance the efficiency of the packing body of the present invention. Each arcuate member 22 is interconnected to its adjacent arcuate members by at least one radially extending strut 24. However, it is preferred that a plurality of radially extending struts 24 be utilized to connect adjacent pairs of arcuate members 22 in order to define open cellular units 16 as well as to provide aditional structural integrity to web 14 and hence to body 10.

It should also be noted that core 12 is shown in FIG. 2 as being a hollow cylinder open at both ends. This configuration is preferred as it provides an additional degree of surface area. However, a solid central core is also contemplated as being within the scope of the present invention.

Turning now to FIG. 4, an alternative embodiment of the present invention is shown in which the 100 series of reference numerals is utilized to designate structural elements which are analogous to core 12, web member 14, cellular unit 16, rib member 18, arcuate member 22, strut 24 and radius 26 of the preferred embodiment of FIGS. 1-3. In this alternative embodiment, the arcuate members 122 of web member 114 are not smoothly curving. Rather, in this alternative embodiment arcuate members 122 are faceted, being formed of a continuous sequence of substantially straight sections rather than the smoothly flowing continuously curving arcuate members shown in FIG. 2.

It will be appreciated that the faceted arcuate members of FIG. 4 will form a generally symmetrical packing body having a polygonal outer configuration as opposed to the generally spherical packing body formed of the smoothly curving arcuate members of FIG. 2. Either configuration is preferred as it provides the generally uniform distribution of open cellular units within the packing body of the present invention. Additionally, it should be noted that the generally polygonal outer configuration of the alternative embodiment of the present invention can be formed with any number of faces.

It should also be noted that while the illustrated configurations of web members 14 and 114 are preferred, additional configurations are also contemplated as being within the scope of the present invention. For example, generally planar web members provided with a plurality of substantially uniformly distributed open cellular units may also be utilized. These web members could be in the form of generally planar sheets provided with uniformly distributed circular or polygonal holes. Similarly, a generally planar web member formed of a loosely woven open mesh or lattice-work may also be utilized. However, it should be emphasized that the illustrated configurations are preferred as they are the least sensitive to fluid flow orientation within a packed column.

Though the preferred configuration of packing body 10 utilizes roughly planar web members 14 and 114 extending substantially continually along the longitudinal extent of core 12 and 112, it is also contemplated that for ease of manufacturing web members 14 and 114 may be bisected along an equatorial plane perpendicular to core 12 as defined by radius 26 and 126 in FIGS. 2 and 4. The opposing pairs of generally longitudinally aligned web member subportions defined by this bisection may then be offset (not shown) with respect to one another in order to facilitate the molding of body 10.

Figure 5:
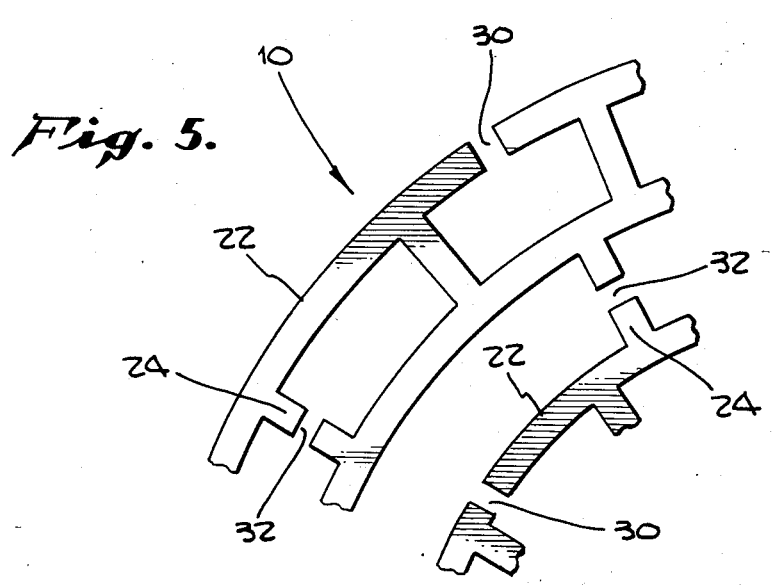
FIG. 5 illustrates in partial cross section an alternative embodiment having cut or bisected members.
Figure 6:
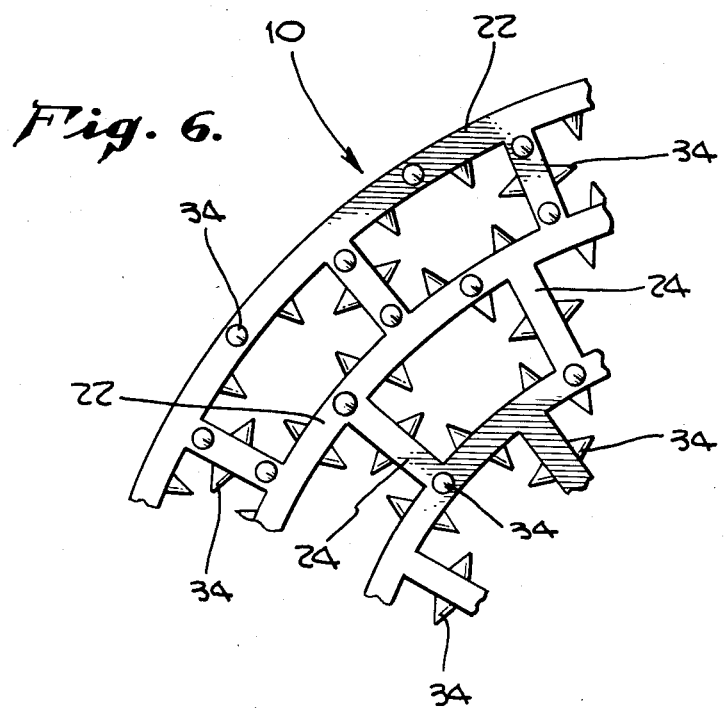
FIG. 6 illustrates in partial cross section an alternative embodiment provided with projecting fingers.

FIGS. 5 and 6 show alternative embodiments of packing body 10 in which additional drip formation points 30 are formed by cutting or bisecting arcuate members 22 at various positions along their arcuate extent. Similarly, additional drip formation points may be provided by cutting or bisecting rib members 18 (not shown) or struts 24 as indicated by reference numeral 32. It is also contemplated as being within the scope of the present invention to provide additional drip formation points as projecting fingers 34 at various points within the packing body as shown in FIG. 6.

Thus, it will be appreciated by those skilled in the art that the improved packing body 10 of the present invention provides an optimum geometric distribution of surface area inside a column packing structure. As illustrated in the preferred exemplary embodiments, this is accomplished through the unique geometrically symmetrical structural configuration of its longitudinal core 12 and 112, concentric arcuate members 22 and 122 and radially extending struts 24 and 124 which define web members 14 and 114 and the plurality of open cellular units 16 and 116 therein. This unique internal and external geometry provides a maximal amount of exposed wettable surface area with a minimal amount of obstruction to gas or liquid flow regardless of the orientation of body 10 with respect to fluid flow.

Those skilled in the art will appreciate that the energy required to drive a gas stream through any packing media against the thrust of liquid flow in a packed column or tower is, in most cases, as important a design parameter as the operating efficiency of the packing media. Due to its unique open symetrical geometry, the packing body of the present invention allows free and even passage of gas and liquid streams through its entire structure while simultaneously providing a high surface area of contact. This low resistance to fluid flow is achieved regardless of the orientation of packing body 10 within a packed column or tower. As a result, packing body 10 can be dumped into a column or tower without fear of the occlusion of fluid flow and its attendant problems.

Moreover, interconnecting rib members 18 and 118 disposed about or near the surface of body 10 effectively resist the deformation and interlocking of adjacent body members within a packed column or tower. Similarly, the lack of any projections about the outer surface of body member 10 also prevents undesirable interlocking or displacement of the individual packing bodies. Accordingly, fluid flow within a column packed with the improved body member of the present invention is uniform throughout the columnar extent and the problems of channeling, chimneying and fouling normally associated with nonuniform fluid flow are absent.

Additionally, because fluid flow is also unobstructed within the internal volume of each individual packing body 10, the highest degree of surface area for any given size packing body can be achieved. In contrast to the broad flat surface areas presented by the prior art packing bodies, the surface area of the packing body of the present invention has been optimized for the sustained wettability of the surface area through the provision of a large number of relatively small angled or curved surface areas. These angled or curved surfaces are more effectively wetted due to the interaction of fluid surface tension and gravity with the smaller curved or inclined surfaces of the present invention as opposed to the broad flat surfaces of the prior art.

Along these lines, it will be appreciated that the various structural elements forming the ribs, struts, and arcuate members of the present invention can have a variety of cross-sectional areas ranging from simple circular cross sections to more elaborate ribbed or fluted cross-sectional areas which will further increase the available surface area and enhance the wettability of the packing body of the present invention. Additionally, the large number of small interconnected structural elements forming the packing body of the present invention also provide a superior degree of structural resiliency and resistance to deformation.

Of even more significance to the overall effectiveness of the packing body of the present invention, the large number of intersecting elements provides a maximal number of dripping points. A dripping point is an area where liquid will tend to accumulate and break off into droplets due to capillary attraction and gravity. Droplet formation is extremely beneficial to the performance of any packing media as it will vastly increase the available surface area for gas/liquid and liquid/liquid interaction. Each intersecting element of the packing body of the present invention provides such a dripping point. The novel structural configuration of the present invention increases this number of dripping points from a few times to more than 100 times that of the prior art. Thus, in addition to providing a nonrestrictive fluid flow and an increased surface area, the packing body of the present invention provides a markedly increased droplet formation which further enhances its mass or heat transfer effectiveness.

It should be appreciated that the packing body of the present invention can be scaled to a variety of sizes simply through the addition or removal of web members or arcuate members within each web. Thus, the uniform geometry of the packing body can be maintained throughout a variety of sizes. Additionally, the packing body of the present invention can be formed of a variety of materials to be compatible with a broad range of anticipated working environments. For example, the packing body can be formed of plastic, metal, glass or ceramic.

In closing, it is to be understood that the embodiments of the invention disclosed herein are illustrative of the principles of the present invention and that other mechanical and design variations may be employed which are within the scope of the present invention. Thus, by way of example and not of limitation, additional open cellular units may be added or a number of the radially extending struts or arcuate members or rib members may be cut or bisected to further increase the number of dripping points. Further, as discussed above, the web members may be bisected and laterally skewed with respect to one another or shaped in other than a generally planar manner. Additionally, projecting fingers may also be provided at various points within the packing body. However, it is to be understood that the generally geometrically symetrical packing body as shown in the illustrative embodiments of the present invention is preferred. Accordingly, the present invention is not limited to the particular embodiments which have been illustrated and described in detail herein.

What is claimed is:

1. An improved high efficiency, high performance packing body for use in packed columns, towers or the like, said packing body comprising:
   a longitudinally extending central core;
   a plurality of longitudinally disposed generally concentric arcuate members radially extending from said central core and generally uniformly spaced apart from one another; and
   a plurality of generally radially extending struts generally uniformly spaced apart from one another and interconnecting adjacent pairs of said arcuate members to define a plurality of generally uniformly spaced open cellular units within a packing body having a generally symmetrical configuration.

2. The improved packing body of claim 1, further comprising:
   means rib for interconnecting at least some of said arcuate members.

3. The improved packing body of claim 2, wherein said means for interconnecting comprises a plurality of rib members spaced remotely from said central core and interconnecting adjacent arcuate members.

4. The improved packing body of claim 1 wherein each of said arcuate members is smoothly curving thereby defining a packing body having a generally spherical outer configuration.

5. The improved packing body of claim 1 wherein each of said arcuate members is faceted thereby defining a packing body having a generally polygonal outer configuration.

6. The improved packing body of claim 1 wherien said central core is solid.

7. The improved packing body of claim 1 wherein said central core is hollow.

8. The improved packing body of claim 1 wherein at least some of said strut members are bisected to provide additional drip points.

9. The improved packing body of claim 1 further comprising a plurality of projecting fingers extending from at least some of said arcuate members or radially extending struts.

10. The improved packing body of claim 1 wherein at least one of said arcuate members is cut to provide additional drip points.

11. An improved high efficiency, high performance, packing body for use in packed columns, towers or the like, said packing body comprising:
    a longitudinally extending central core;
    a plurality of web members generally radially extending from said core in substantially axial alignment therewith, each of said web members formed of a plurality of generally concentric arcuate members generally uniformly spaced apart from one another along the radial extent of each of said web members, adjacent pairs of said arcuate members being interconnected by at least one generally radially extending strut to define a plurality of open cellular units generally uniformly distributed along the radial extent of each of said web members; and
    means for interconnecting at least some of said web members, said means for interconnecting comprising a plurality of rib members spaced remotely from said central core in communicative engagement between at least some of said web members, whereby said packing body is provided with a plurality of open cellular units generally uniformly distributed from its central core throughout its generally symmetrical configuration.

12. The improved packing body of claim 11 wherein each of said arcuate members is smoothly curving thereby defining a packing body having a generally spherical outer configuration.

13. The improved packing body of claim 11 wherein each of said arcuate members is faceted thereby defining a packing body having a generally polygonal outer configuration.

* * * * *